May 11, 1926. 1,583,880
J. G. HARROLD
FIRE EXTINGUISHING APPARATUS
Filed Jan. 18, 1923  2 Sheets-Sheet 1
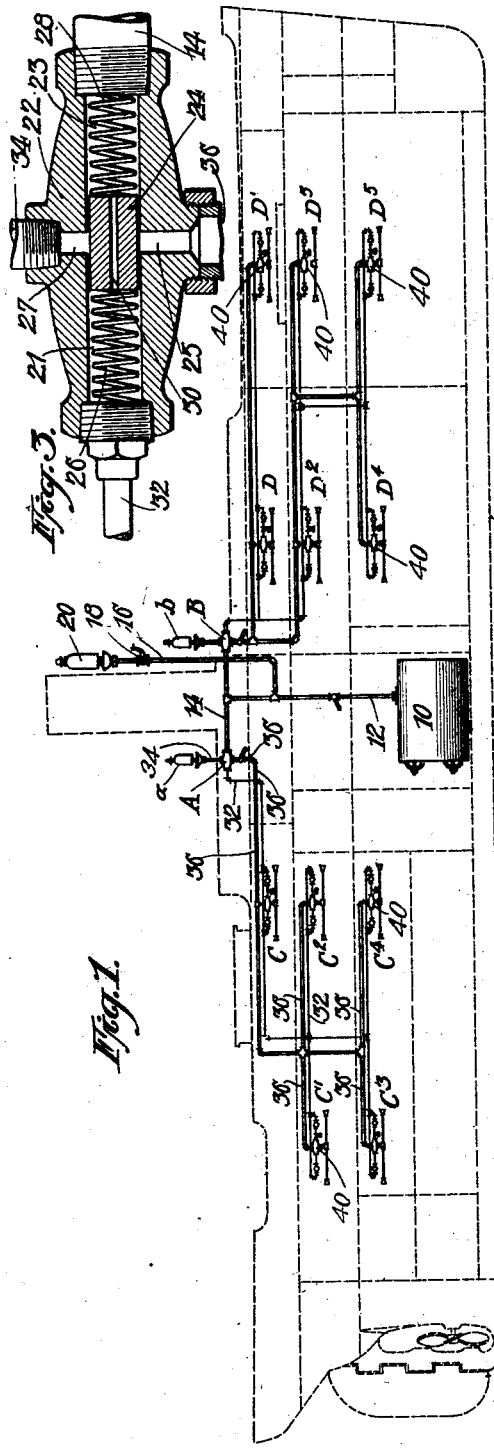
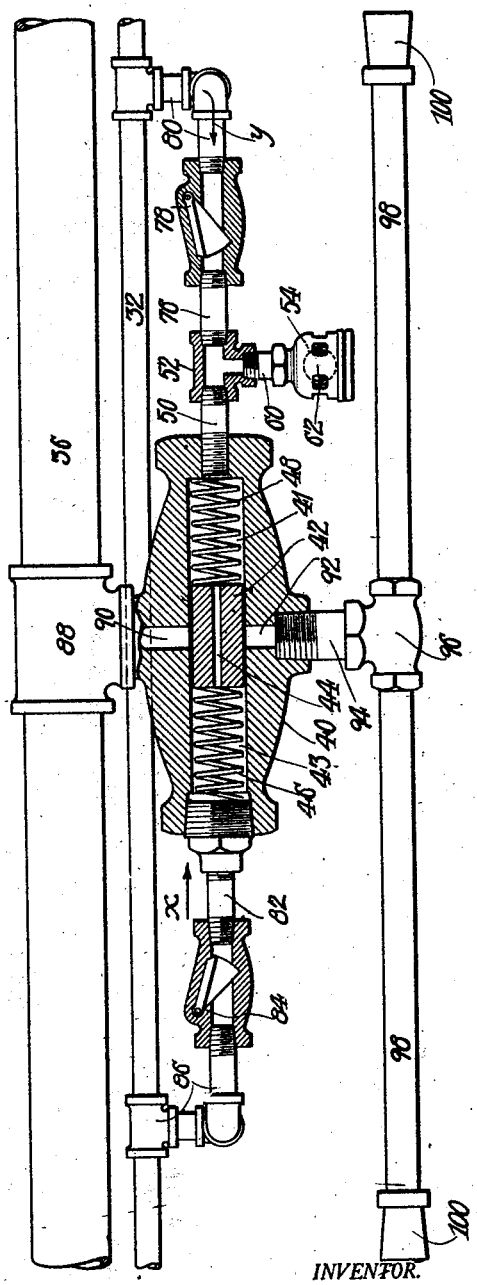
INVENTOR.
JOHN G. HARROLD.
BY
ATTORNEY.

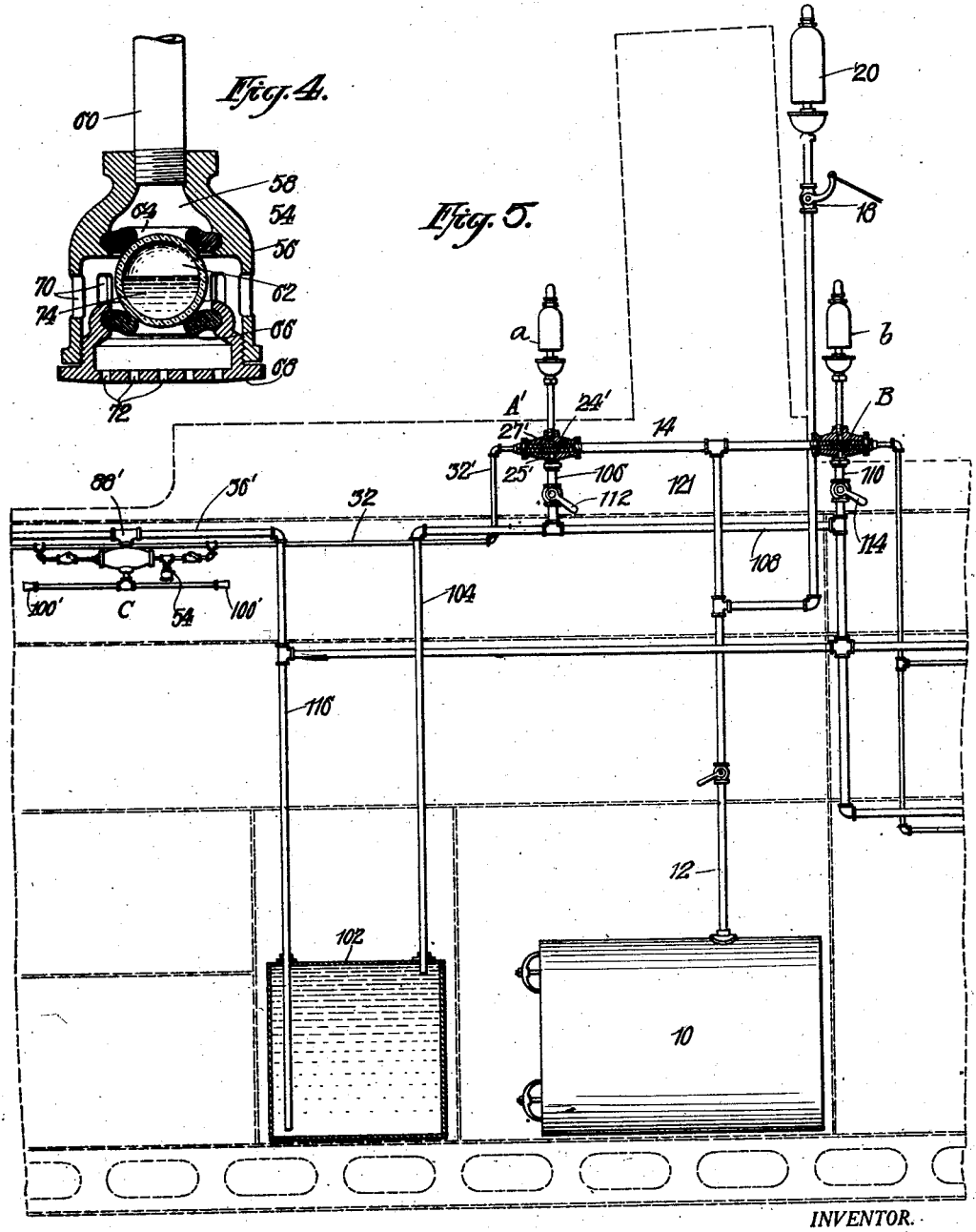

Patented May 11, 1926.

1,583,880

UNITED STATES PATENT OFFICE.

JOHN G. HARROLD, OF NEWARK, NEW JERSEY.

FIRE-EXTINGUISHING APPARATUS.

Application filed January 18, 1923. Serial No. 613,552.

This invention relates to fire extinguishing apparatus and aims to provide improved means whereby the apparatus will become effective automatically when the temperature exceeds a predetermined point.

In the accompanying drawings which illustrate embodiments of the invention, Fig. 1 is a diagrammatic view showing my improved apparatus installed on board a ship; Fig. 2 is an enlarged detail illustrating one of the discharge units of the apparatus and valve controlling the same;

Fig. 3 is a detail view illustrating a master valve which controls the flow of fluid to the several discharge units;

Fig. 4 is a detail view illustrating a member which is responsive to temperature changes and adapted to control the operation of the master valve and the discharge unit;

Fig. 5 is a slightly modified arrangement of the apparatus shown in Fig. 1, this view, however, being on a larger scale.

In the drawings 10 represents a steam boiler or other suitable source of fluid pressure which is connected by means of a pipe 12 with a branch pipe 14 leading to master-control valves A and B.

In Figs. 1 and 5 there are two such master-control valves shown, although it is to be understood that a greater number thereof can be employed when desired. The master valve A controls a plurality of discharge units C, C′, C², C³ and C⁴, these units being shown as located aft on ship board. The master valve B similarly controls a number of discharge units D, D′, D², D³ and D⁴ located amidship and in the forecastle of the ship. A fire whistle $a$ is connected with the master valve A and a similar whistle $b$ is connected with the master valve B. These whistles are arranged to automatically give an alarm when the temperature exceeds a predetermined point in the aft or forward parts respectively of the ship. A branch pipe 16 is connected with the pipe 12 and has the usual manually operated valve 18 for controlling the steam whistle 20 usually provided on ship board.

As will be more fully described hereinafter, the arrangement is such that when a dangerous temperature is reached in any part of a ship, a member which is responsive to temperature changes will be operated to unbalance pressure in a piping system and this action will cause the corresponding master valve A or B to permit the discharge of fluid from the particular discharge unit to C—C⁴ or D—D⁵ according to the location in which the fire has started or in the location to which a dangerous temperature has been reached.

The several discharge units C—C⁴ and D—D⁵ are substantially identical in construction and the master valves A and B are also substantially of the same construction, hence a single description of each will suffice for all.

Each master valve comprises a casing 22 having mounted therein a movable piston 24 which is normally held in its central position by springs 26 and 28 and by the balance pressure of the fluid on either side thereof. The piston 24 is provided with a port 30 extending axially therethrough. One side of the valve is connected with the fluid supply pipe 14 as shown and the other side of the valve is connected with a small pipe 32 adapted to convey fluid to the several discharge units. A pipe 34 is connected to the valve body 22 and leads to the fire whistle $a$ and another pipe 36 is connected with a master valve and adapted to convey fire extinguishing fluid to the several discharge units. This pipe has therein a number of branches, as shown in Fig. 1, which are adapted to deliver the fluid to the units C′—C⁴, the unit C being connected by a T-connection in the first run of the pipe. The small pipe 32 is also provided with a number of branches as shown in Fig. 1 and provides means whereby fluid is conveyed to the valves 40 of each of the discharge units. The valves 40, for purposes of identification, are hereinafter called secondary valves and they are quite similar in construction and operation to the master valves above described. Each secondary valve 40 includes a piston 42 having a port 44 extending axially therethrough and said piston is normally held in the central position as shown in Fig. 2 by means of springs 46 and 48, and also by the balanced pressure on the opposite sides of the piston. One end of each valve 40 is connected by a pipe 50 with a fitting 52 having a member 54 in connection therewith which member is adapted to automatically vent the pressure in the pipe 32. The member 54 comprises a body portion 56 which encloses a chamber 58 communicating by way of pipe 60 with the fitting 52. A breakable glass bulb 62 is seated at one point on a washer or gasket 64 mounted in the member 54 and at the other end this bulb is seated against a washer 66 carried by a cap 68 which is removably secured by means of screw threads or otherwise to the member 54. The body of the device is provided with a plurality of ports 70 and the cap 68 is formed with a series of perforations 72 so that when the mercury or other expansible fluid 74 contained in the bulb 62 is expanded by heat and broken, the pressure of fluid from the pipe 32 will be vented and escape through the ports 70 and perforations 72. Connected with the fitting 52 is a nipple 76 communicating with the check valve 78 which in turn is connected by pipes and fittings 80 with the pipe line 32. At the opposite end of the valve 40 a pipe 82 communicates through a check valve 84 with pipes and fittings 86 which in turn also connect with the pipe line 32. Steam or other fire extinguishing fluid is supplied to the valve 40 by means of the pipe line 36 which communicates through fittings 88 which lead to a port 90 in each secondary valve. In line with the port 90 of the valve is a port 92 and communication between these ports is normally closed by the piston 44. Port 92 communicates by means of nipple 94 and T 96 with branch pipes 98 which terminate in discharge nozzles 100.

Normally there is no pressure in the pipe line 36 and there is only a slight pressure in the small pipe line 32. The pressure in the line 32 is established from the boiler 10 through pipes 12 and 14 and through the port 30 in the piston 24 of the master valve. This port is of restricted area and allows only a slight pressure to build up in the pipe line 32 and associated parts. The fluid from pipe line 32 is free to pass through the axial port 44 in each of the pistons 42 carried by the secondary valves and hence the pressure on each side of each piston 42 is balanced. The check valves 84 and 78 are arranged as shown in Fig. 2 so that the fluid can flow from pipe 32 in the direction of the arrows $x$ and $y$, and these check valves are so arranged that the fluid cannot flow in the opposite direction to the arrows.

In operation the pistons of the master valves and the pistons of the secondary valves are normally in the position illustrated in Figs. 2 and 3. In the event of fire in any part of the ship or in the event of the temperature exceeding a predetermined point the mercury filled bulbs 62 will be broken thus permitting pressure to escape from the pipe 32. This will cause the pressure in the chamber 21 to fall below the pressure in the chamber 23 and thus permit the piston 24 (Fig. 3) to move to the left under the influence of the pressure of the fluid supplied by pipe 14. This action will open communication between the port 25 and chamber 23 of the master valve to permit fluid to flow from the pipe 14 to the pipe line 36, thus making available a supply of fire extinguishing fluid for each of the discharge units. The movement of the piston 24 will also permit some of the fluid to escape through port 27 to sound the fire whistle. The fall in pressure in pipe line 32 due to the breakage of the bulb 62 also causes an unbalancing of the pressure in the chambers 41 and 43 of the secondary valve 40 thus permitting the piston 42 to move (to the right in Fig. 2) so as to open communication between the ports 90 and 92 and thus permit discharge of the fire extinguishing fluid from the nozzles 100; this fluid being supplied as will be understood by the pipe 36, it being remembered that the piston 24 has been moved to the left from the position shown in Fig. 3 so as to open communication from the fluid supply to the pipe 36. When this automatic operation takes place the fluid is prevented from flowing through the pipe 32 back to the master valve by the check valve 84, it being apparent that pressure contrary to the arrow $x$ will close the check valve. The check valve 78 similarly prevents pressure from flowing contrary to the arrow $y$.

In the above described embodiment of my invention, the fluid used for quenching the fire is steam supplied from a suitable boiler 10 which may be part of the power equipment on board ship or may be an auxiliary boiler. I am not limited to the use of steam or like fluid to quench the flame and in fact contemplate the use of a suitable fire extinguishing medium which may be either a liquid or a gas.

In Fig. 5 I have shown my apparatus connected up in such a way that in the event of fire or in the event of an unsafe temperature being reached fire extinguishing liquid will be discharged from a tank 102 which is connected by means of pipes 104 and 106 with a master valve A′ and the pipe 104 is also connected by a branch 108 and pipe 110 with the master valve B′. Suitable manually operated valves 112 and 114 are located in the pipes 106 and 110 respectively as shown. The master valves A′ and B′ are adapted to control the supply of fire extinguishing fluid to the several discharge units as described in connection with Fig. 1, only one such discharge unit C being shown in this figure however.

The operation of this form of the apparatus is quite similar to the operation above described, the chief difference being that upon breakage of the bulb in any of the members 54, the extinguishing fluid contained in tank 102 will be discharged from the nozzles 100′ instead of steam as discharged directly from the boiler 10 in the arrangement of Fig. 1. Breakage of the bulb in the unit 54 will cause a drop in pressure in the pipe line 32′ which will permit the piston 24′ to move to the left. This will open communication between the ports 27′ and 25′ of the valve 24′ and permit steam to flow from the boiler 10 by way of pipes 12 and 14 through pipes 106 and 104 to the tank 102. This pressure will cause the fire extinguishing fluid in the tank 102 to flow from pipe 116 to the pipe 36′ and fitting 88′ and through ports, not shown, but similar to the ports 90 and 92 shown in Fig. 2 and said fluid will be discharged from the nozzles 100′.

Though I have described with great particularity the details of construction and the general arrangement of the apparatus herein shown, it is not to be construed that I am restricted to such details or arrangement as various changes may be made by those skilled in the art without departing from the invention as defined in the appended claims.

What I claim is:

1. A fire extinguishing apparatus including in combination a plurality of units each having a discharge outlet and a secondary valve responsive to pressure changes of a fire extinguishing fluid and controlling the passage of said fluid through said outlet, a master valve responsive to a pressure decrease of the fire extinguishing fluid connected by a duct to the secondary valve and means including a member responsive to temperature changes adapted to unbalance the pressure between the secondary and master valves.

2. A fire extinguishing apparatus including in combination a plurality of units each having a discharge outlet and a secondary valve responsive to pressure changes of a fire extinguishing fluid and controlling the passage of said fluid through said outlets, a master valve responsive to a pressure decrease of the fire extinguishing fluid, means for normally maintaining a pressure balance between the latter and said secondary valve, and means for releasing the pressure balance when the temperature exceeds a determined point.

3. A fire extinguishing apparatus including in combination, a source of fire extinguishing fluid, a plurality of discharge units each including a secondary valve having a piston therein, a master valve having a movable piston controlling the supply of fire extinguishing fluid to said secondary valves, ducts connecting the secondary valves, the master valve and the source of fire extinguishing fluid whereby the pressure on opposite sides of the pistons in the master valve and secondary valves in normally balanced, and venting means associated with each discharge unit in said connections adapted to unbalance the pressure and permit the piston in the master valve and in at least one of said secondary valves to move so as to permit the discharge of the fire extinguishing fluid.

In witness whereof, I have hereunto signed my name.

JOHN G. HARROLD.